(12) United States Patent
Tezuka

(10) Patent No.: US 10,477,067 B2
(45) Date of Patent: Nov. 12, 2019

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Taiki Tezuka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/216,340

(22) Filed: Dec. 11, 2018

(65) Prior Publication Data
US 2019/0191056 A1 Jun. 20, 2019

(30) Foreign Application Priority Data
Dec. 19, 2017 (JP) ................ 2017-243008

(51) Int. Cl.
H04N 1/405 (2006.01)
G06T 7/12 (2017.01)
G06T 7/11 (2017.01)

(52) U.S. Cl.
CPC ............ *H04N 1/4057* (2013.01); *G06T 7/11* (2017.01); *G06T 7/12* (2017.01); *H04N 1/4058* (2013.01)

(58) Field of Classification Search
CPC ...... H04N 1/4057; H04N 1/4058; G06T 7/12; G06T 7/11
See application file for complete search history.

(56) References Cited

FOREIGN PATENT DOCUMENTS

JP 2009-271377 A 11/2009

*Primary Examiner* — Christopher Wait
(74) *Attorney, Agent, or Firm* — Canon USA, Inc., IP Division

(57) ABSTRACT

An image forming apparatus in which a lighting position of a dot to be firstly generated by screen processing is changed, in a vertical direction, between a first sub-matrix and a second sub-matrix that are included in a dithering matrix and that are adjacent to each other in a lateral direction, in order not to generate a region where no dot exists in a main scanning direction.

11 Claims, 16 Drawing Sheets

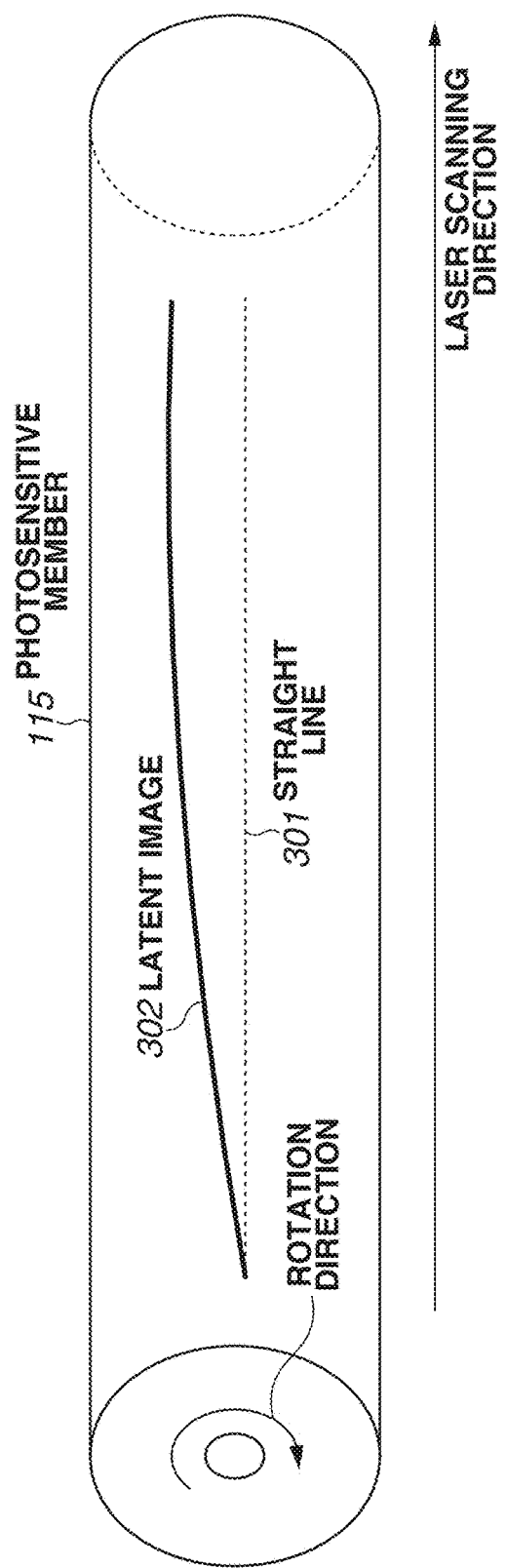

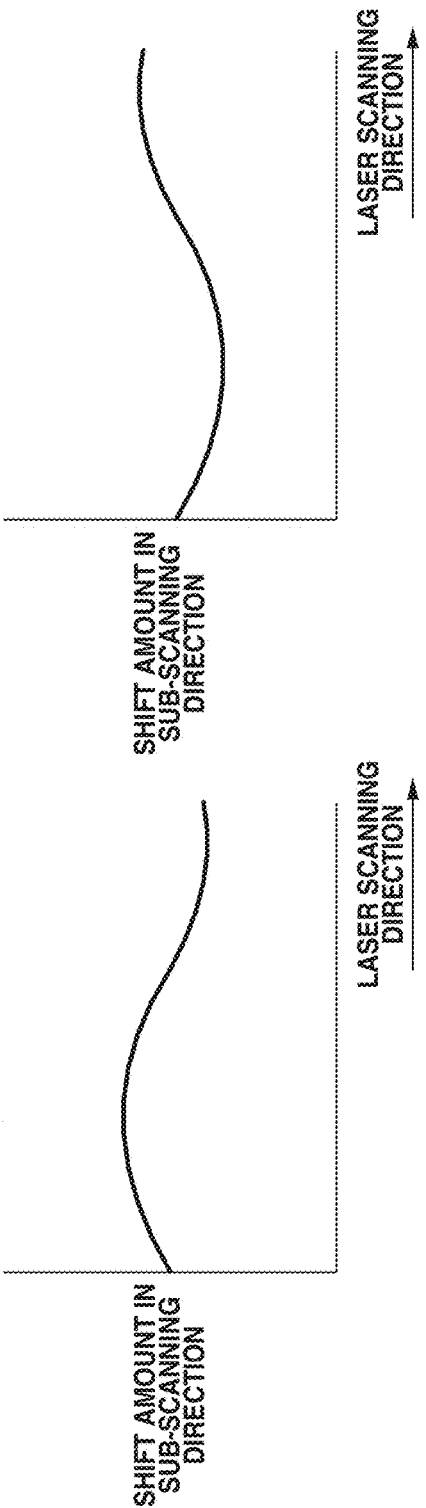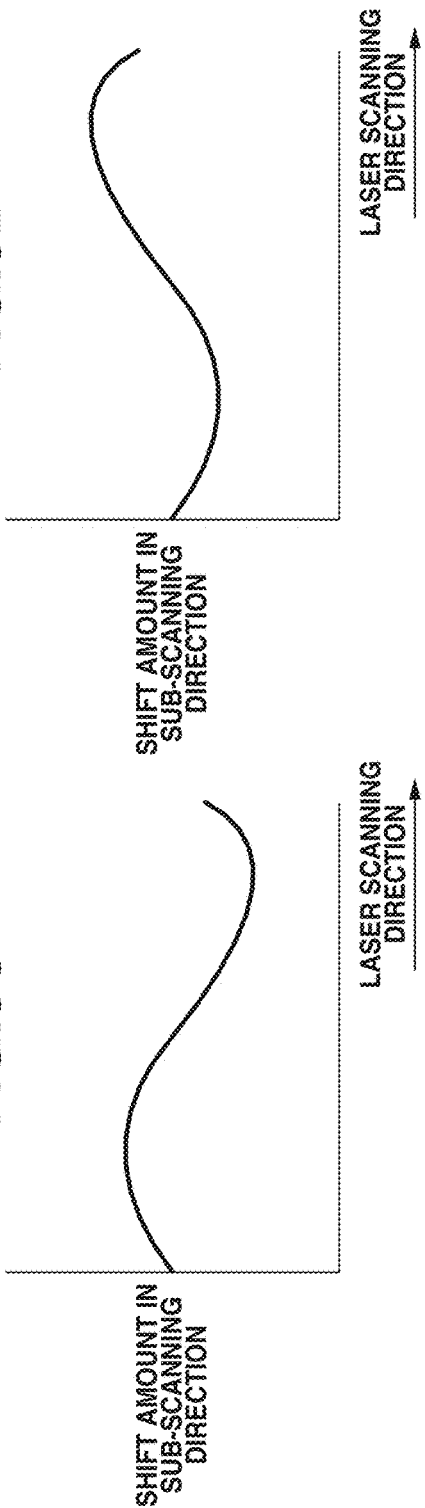

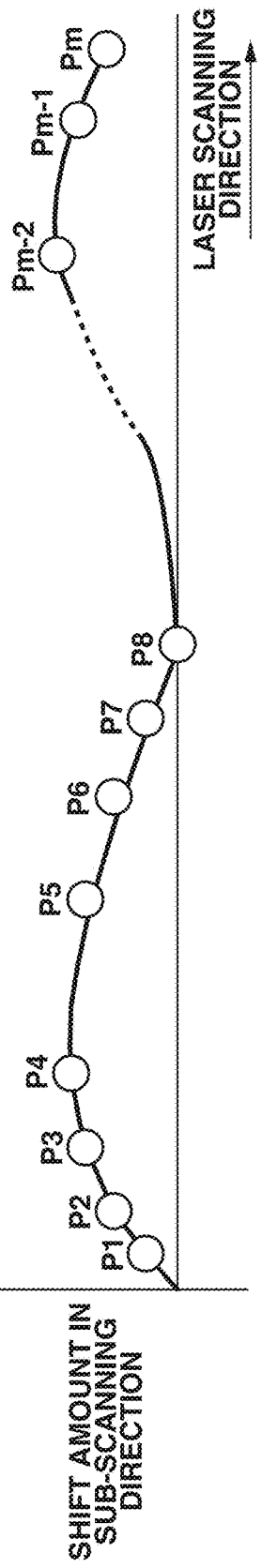
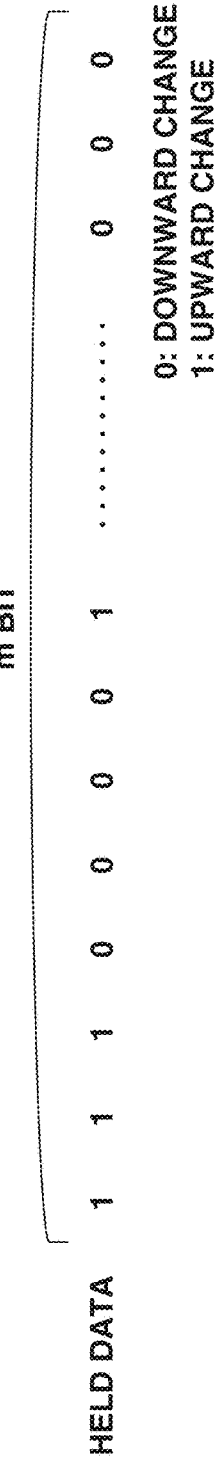
FIG.6A
FIG.6B
FIG.6C

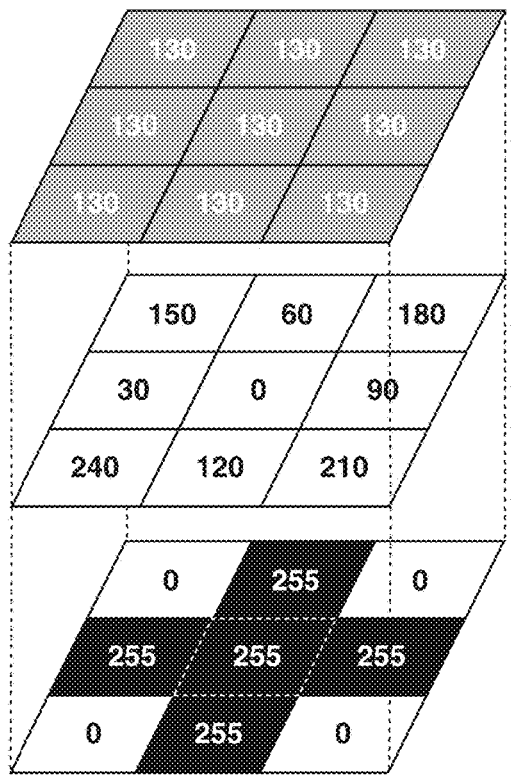
FIG.8A IMAGE DATA
FIG.8B DITHERING MATRIX
FIG.8C SCREEN IMAGE
FIG.8D
DITHERING MATRIX: FOUR PIXELS IN MAIN SCANNING DIRECTION
TWO PIXELS IN SUB-SCANNING DIRECTION
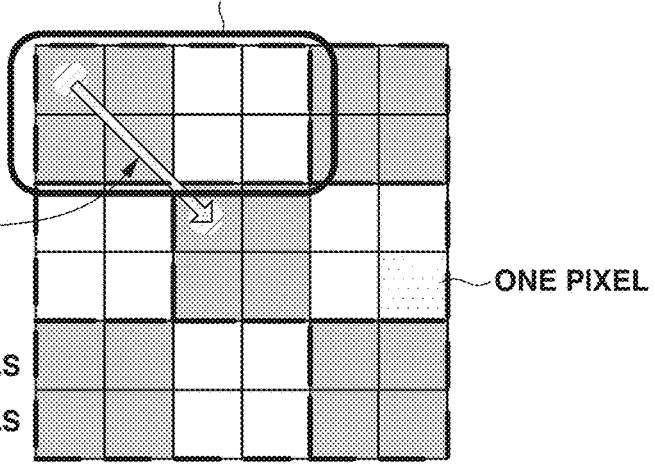
INTER-DOT DISTANCE
MAIN SCANNING DIRECTION: TWO PIXELS
SUB-SCANNING DIRECTION: TWO PIXELS
ONE PIXEL FIG.14A
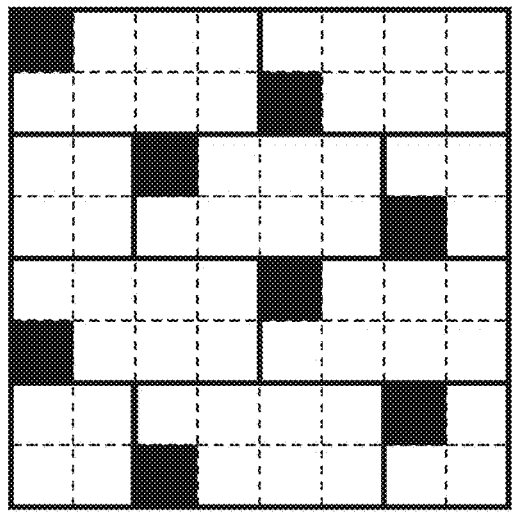
FIG.14B
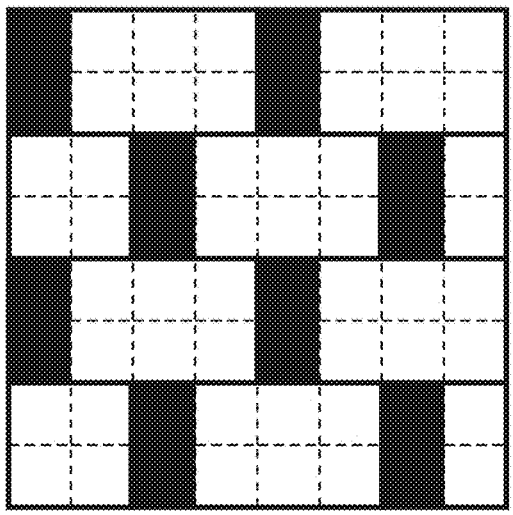
FIG.14C

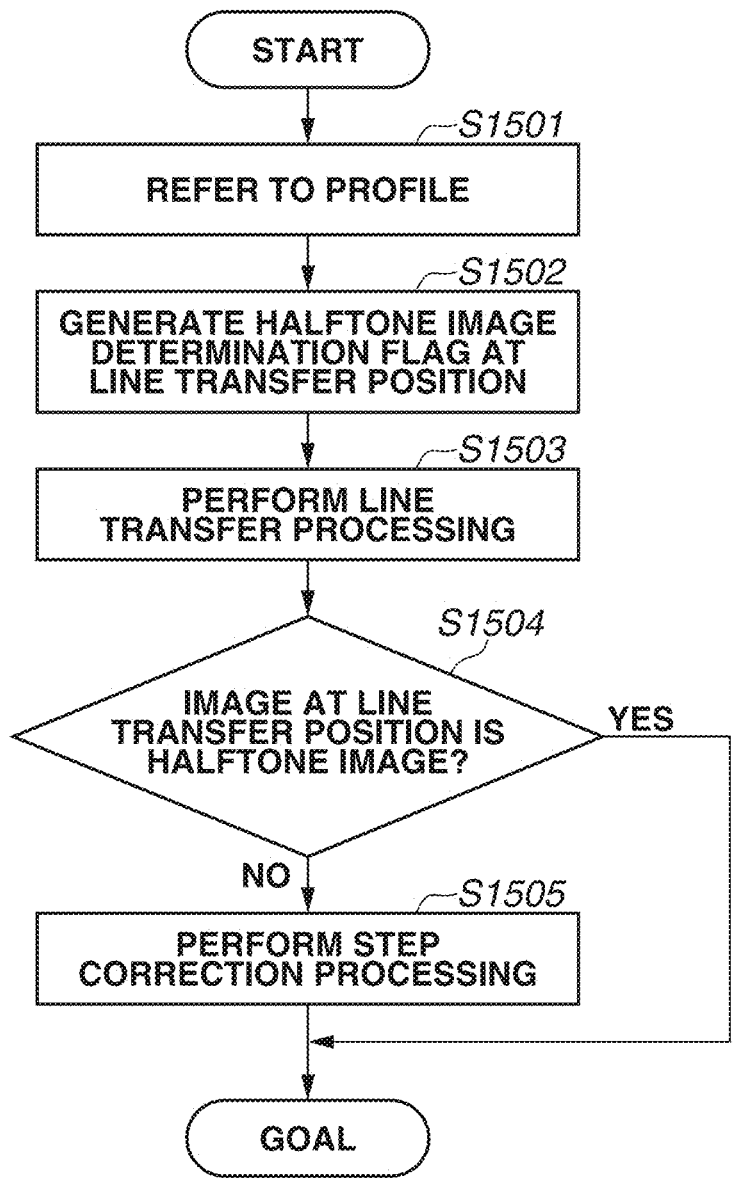

DETERMINATION REGION

IMAGE FORMING APPARATUS, IMAGE FORMING METHOD, AND STORAGE MEDIUM

BACKGROUND

Technical Field

The present disclosure generally relates to image forming and, more particularly, to an image forming apparatus, an image forming method, and a storage medium.

Description of the Related Art

In recent years, a color image forming apparatus of a tandem system has been increasing. The color image forming apparatus of the tandem system includes developing units and photosensitive drums. The number of the developing units and the number of the photosensitive drums are the same as the number of toner colors in order to increase image formation speed of an electrophotographic color image forming apparatus. The color image forming apparatus of a tandem system sequentially transfers images in different colors on an image conveyance belt or a recording medium. It is known that, in the color image forming apparatus of the tandem system, there is a plurality of factors causing a registration shift, and various measures against the respective factors have been proposed.

One of the factors that causes the registration shift is unevenness or shift of an attachment position of a lens in a deflection scan device. The shift of the attachment position causes an inclination and a curve of a scan line, and a degree of the inclination and a curve direction of the scan line are different between colors. The difference between the colors causes the registration shift.

As a measure against the registration shift, Japanese Patent Application Laid-Open No. 2009-271377 discusses a method in which an optical sensor measures the degree of the inclination and the curve of the scan line of a beam, and bitmap image data is offset in a sub-scanning direction so as to cancel the inclination and the curve to form a corrected image. The method discussed in Japanese Patent Application Laid-Open No. 2009-271377 electrically corrects the image data, thereby eliminating needs of mechanical adjustment member and an adjustment step in assembly. This makes it possible to reduce the size of the color image forming apparatus, and reduce the cost of correcting the registration shift. In the following descriptions, the offset position is referred to as a line transfer position. Correction for less than one pixel is performed by adjusting a tone value of image data with prior and subsequent pixels of the target pixel in the sub-scanning direction. In other words, smoothing processing is performed using pixel values of a pixel of interest and prior and subsequent pixels of the pixel of interest in the sub-scanning direction so as to cause a centroid position of an original straight line and a centroid position of the line after the offset processing to coincide with each other.

For example, visibility of information about a character and a thin line is enhanced when interpolation processing is performed for smoothing. On the other hand, when the interpolation processing is performed at the line transfer position of the halftone image that has been subjected to screen processing, density unevenness occurs only on the line transfer position to deteriorate image quality. This is because, for example, in a case where a dot growth screen is used, shapes of dots configuring the screen are changed at the line transfer position due to the interpolation processing, and the density looks to be changed macroscopically.

As described above, it is helpful to determine whether to apply the interpolation processing using smoothing, based on an attribute of the image data to be subjected to the interpolation processing.

SUMMARY

According to one or more aspects of the present disclosure, an image forming apparatus includes a screen processing unit configured to perform screen processing on image data based on a result of comparison between a value of a pixel in the image data and a threshold of a dithering matrix corresponding to the pixel, and a determination unit configured to determine whether a pixel of interest is included in a halftone image in the image data having been subjected to the screen processing by the screen processing unit, based on a pixel value in a region having a predetermined length in a lateral direction from the pixel of interest, wherein the dithering matrix includes a plurality of sub-matrices, wherein out of the plurality of sub-matrices, a first sub-matrix and a second sub-matrix that have a same number of pixels in a vertical direction and in the lateral direction are adjacent to each other in the lateral direction, wherein a threshold at a growth center in the first sub-matrix and a threshold at a growth center in the second sub-matrix are located at different positions in the vertical direction, and wherein the predetermined length is larger than that corresponding to the number of pixels in the lateral direction of the first sub-matrix.

Further features of the present disclosure will become apparent from the following description of exemplary embodiments with reference to the attached drawings.

BRIEF DESCRIPTION OF THE DRAWINGS

FIG. 3 is a diagram illustrating a shift in a sub-scanning direction of a latent image on a photosensitive member.

FIGS. 5A to 5D are diagrams each illustrating relationship between the shift and a correction direction of the image forming apparatus.

FIGS. 6A to 6C are diagrams illustrating a method of holding profile characteristics data.

FIGS. 8A to 8D are diagrams illustrating a principle of screen processing.

FIGS. 14A to 14C are diagrams illustrating a lighting order of dots in a dithering matrix according to a first exemplary embodiment.

FIG. 15 is a flowchart of processing relating to an interpolation processing unit.

DESCRIPTION OF THE EMBODIMENTS

Various exemplary embodiments, features, and aspects of the present disclosure are described in detail below with reference to the accompanying drawings. Configurations illustrated in the following exemplary embodiments are merely examples, and the present disclosure is not limited to the illustrated configurations.

Figure 1:
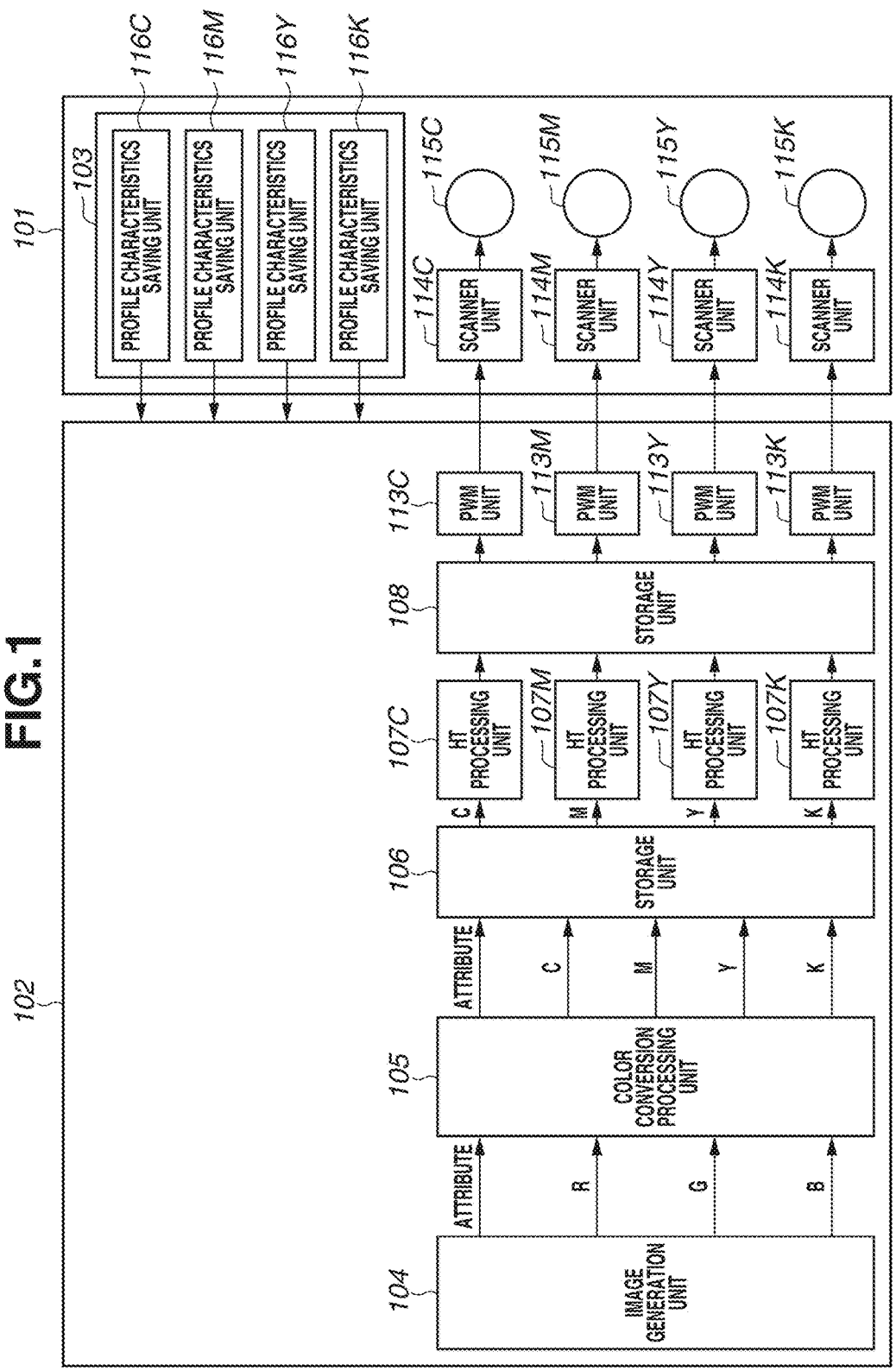
FIG. 1 is a block diagram illustrating a configuration of an image forming apparatus.
Figure 2:
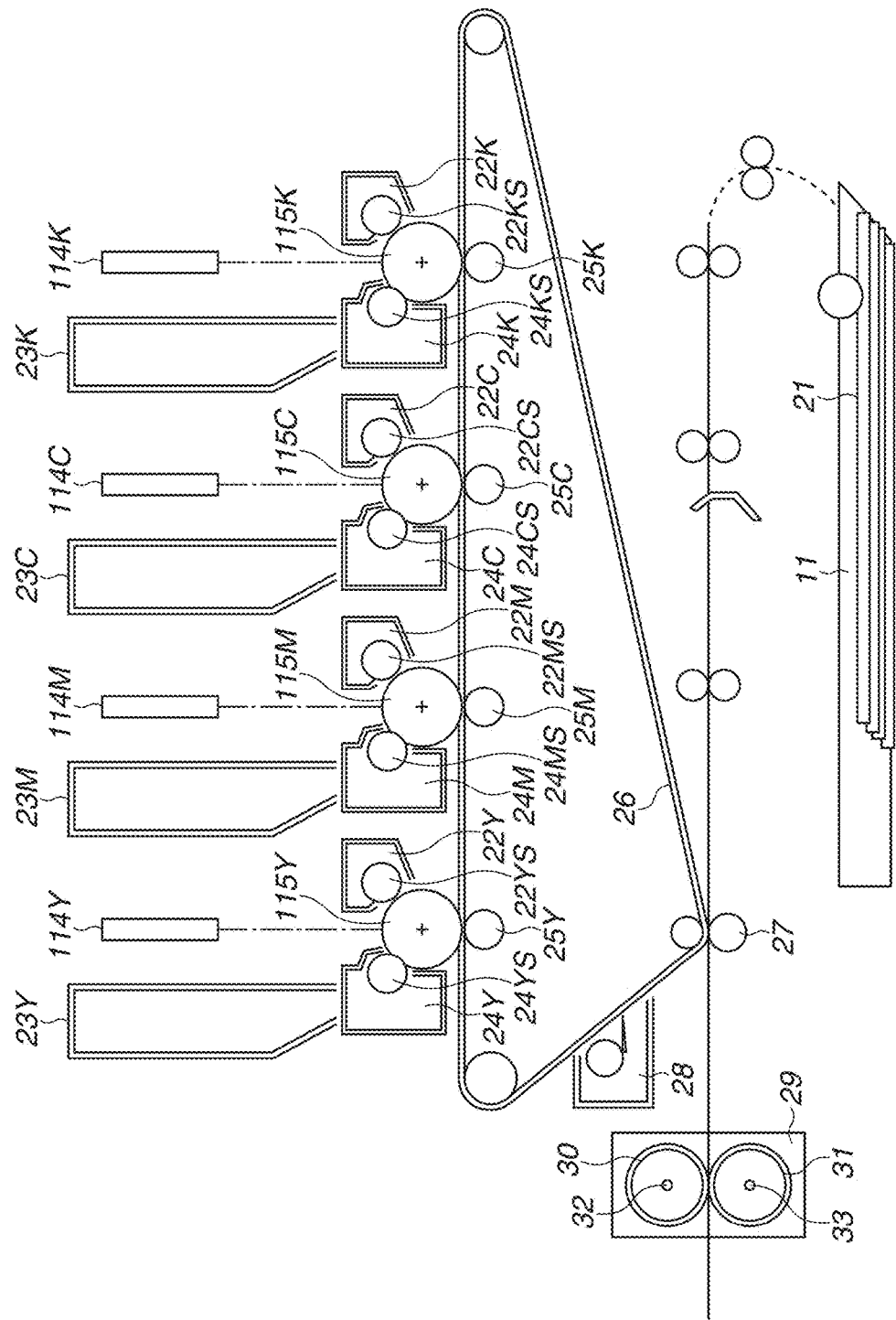
FIG. 2 is a cross-sectional diagram of the image forming apparatus.

FIG. 1 is a block diagram illustrating a configuration relating to electrostatic latent image formation of an electrophotographic color image forming apparatus according to a first exemplary embodiment. In the present exemplary embodiment, a multifunction peripheral (MFP) including a plurality of functions such as a copy function and a printer function is described as an example of the color image forming apparatus. The color image forming apparatus includes an image forming unit 101 and an image processing unit 102. The image processing unit 102 generates bitmap image information, and the image forming unit 101 performs image formation on a recording medium based on the generated bitmap image information. FIG. 2 is a cross-sectional diagram of the electrophotographic color image forming apparatus. Operations of the image forming unit 101 in the electrophotographic color image forming apparatus will be described with reference to FIG. 1.

The image forming unit 101 performs laser exposure for an exposure time based on the bitmap image information processed by the image processing unit 102, to form an electrostatic latent image, and develops the electrostatic latent image to form monochromatic toner images each having a different monochromatic color. The image forming unit 101 superimposes the monochromatic toner images to form a multicolor toner image, and transfers the multicolor toner image on a recording medium 11 of FIG. 2 and fixes the multicolor toner image on the recording medium 11. A device characteristics storage unit 103 stores device characteristic information that includes profile characteristics, described below, for image formation by the image forming apparatus.

An image generation unit 104 generates raster image data that can be printed, based on print data received from a computer apparatus (not illustrated) or other apparatuses, and outputs the raster image data for each pixel as RGB (red, green, blue) data and attribute data indicating data attribute of each pixel. The attribute data holds attributes, for example, a character, a thin line, computer graphics (CG), and a natural image.

A color conversion processing unit 105 converts the RGB data into CMYK (cyan, magenta, yellow, black) data corresponding to toner colors of the image forming unit 101, and stores the CMYK data and the attribute data in a storage unit 106 including a bitmap memory. The storage unit 106 is a first storage unit provided in the image processing unit 102 and temporarily stores the raster image data to be printed. The storage unit 106 may be configured as a page memory that stores image data for one page, or as a band memory that stores data for a plurality of lines.

Halftone (HT) processing units 107 (107C, 107M, 107Y, and 107K) perform halftone processing on each color data output from the storage unit 106 to convert input tone into pseudo-halftone expression, and perform registration correction processing on the data. The HT processing units 107 each include an interpolation processing unit and perform interpolation processing with use of prior and subsequent pixels of a line transfer position corresponding to curve characteristics of the image forming apparatus. Details of the interpolation processing and the halftone processing are described below.

A storage unit 108 is a second storage unit provided in the image forming apparatus, and stores N-valued data processed by the HT processing units 107. In the present exemplary embodiment, the first storage unit 106 and the second storage unit 108 are described as separate units; however, a common storage unit may be provided in the image forming apparatus. Pulse width modulation (PWM) units 113 (113C, 113M, 113Y, and 113K) convert the image data for respective colors read out from the storage unit 108, into exposure times for respective scanner units 114 (114C, 114M, 114Y, and 114K). The scanner units 114 apply exposure laser corresponding to the respective exposure times generated by the PWM unit 113 to selectively expose surfaces of photosensitive members 115 (115C, 115M, 115Y, and 115K), thereby forming electrostatic latent images.

The photosensitive members 115 receive driving forces transferred from respective driving motors (not illustrated) to rotate, and the driving motors rotate the respective photosensitive members 115 in a counterclockwise direction when the image forming operation is performed.

Profile characteristics saving units 116 (116C, 116M, 116Y, and 116K) saves profile characteristics used to perform registration shift correction to be described below.

Next, an electrophotographic image forming method performed by the image forming apparatus is described with reference to FIG. 2.

Four injection chargers 22Y, 22M, 22C, and 22K in FIG. 2 charge the photosensitive members 115 (115Y, 115M, 115C, and 115K) for the colors Y, M, C, and K, respectively. The injection chargers 22Y, 22M, 22C, and 22K respectively include sleeves 22YS, 22MS, 22CS, and 22KS. Four developer units 24 (24Y, 24M, 24C, and 24K) in FIG. 2 perform development for the respective colors Y, M, C, and K to visualize the above-described electrostatic latent images. The developer units include sleeves 24S (24YS, 24MS, 24CS, and 24KS), respectively. The developer units 24 for the respective colors are detachable.

An intermediate transfer member 26 in FIG. 2 rotates in a clockwise direction to receive the monochromatic toner images from the respective photosensitive members 115, and the monochromatic toner images are transferred along with rotation of the photosensitive members 115 and primary transfer rollers 25 located opposite to the respective photosensitive members 115. When a bias voltage is applied to each of the primary transfer rollers 25 and a rotation speed of each of the photosensitive members 115 is made different from a rotation speed of the intermediate transfer member 26, the monochromatic toner images are efficiently transferred to the intermediate transfer member 26. This operation is referred to as primary transfer.

Further, the monochromatic toner images of the respective colors are superimposed on the intermediate transfer member 26. The superimposed multicolor toner image is conveyed to a secondary transfer roller 27 along with rotation of the intermediate transfer member 26. At the same time, the recording medium 11 is pinched and conveyed from a sheet feeding tray 21 to the secondary transfer roller 27, and the multicolor toner image on the intermediate transfer member 26 is transferred to the recording medium 11. At this time, the toner image is electrostatically transferred through application of an appropriate bias voltage to the secondary transfer roller 27. This operation is referred to as secondary transfer.

A fixing device 29 includes a fixing roller 30 for heating the recording medium 11 and a pressurizing roller 31 for bringing the recording medium 11 into press-contact with the fixing roller 30 in order to melt and fix the multicolor toner image transferred on the recording medium 11, to the recording medium 11. The fixing roller 30 and the pressurizing roller 31 each which is formed of a hollow shape, and respectively include heaters 32 and 33 therein. The fixing device 29 conveys the recording medium 11 holding the multicolor toner image by the fixing roller 30 and the pressurizing roller 31, and applies heat and pressure to fix the toner to the recording medium 11.

Then, the recording medium 11 to which the toner image has been fixed is discharged to a discharge tray (not illustrated) by a discharging roller (not illustrated), and the image forming operation ends. A cleaning processing unit 28 cleans the toner remaining on the intermediate transfer member 26, and waste toner remaining after the multicolor toner image of four colors formed on the intermediate transfer member 26 is transferred onto the recording medium 11 is stored in a cleaner container.

Next, profile characteristics of shift in a sub-scanning direction for each color of the image forming apparatus are described with reference to FIG. 3, FIGS. 4A and 4B, FIGS. 5A to 5D, and FIGS. 6A to 6C.

FIG. 3 is a diagram illustrating an electrostatic latent image actually drawn on the photosensitive member 115 when the scanner unit 114 draws, on the photosensitive member 115, an electrostatic latent image of a straight line image perpendicular to a rotation direction of the photosensitive member 115. The scanner units 114 draws, on the corresponding photosensitive member 115, a scan line 301 perpendicular to the rotation direction of the photosensitive member 115. This corresponds to drawing of a one-dot straight line in a main scanning direction. At this time, the latent image may be drawn at a position resulting from, for example, unevenness, and shift of an attachment position of a lens in a deflection scan device. As a result, an electrostatic latent image 302 may be actually drawn on the photosensitive member 115 due to the shift of the latent image position in some cases. Therefore, a shift amount of the latent image position may be previously measured in the sub-scanning direction and the input image may be corrected based on a result of the measurement. The measured shift in the sub-scanning direction relative to the main scanning position is referred to as the profile characteristics of the shift in the sub-scanning direction.

Figure 4A:
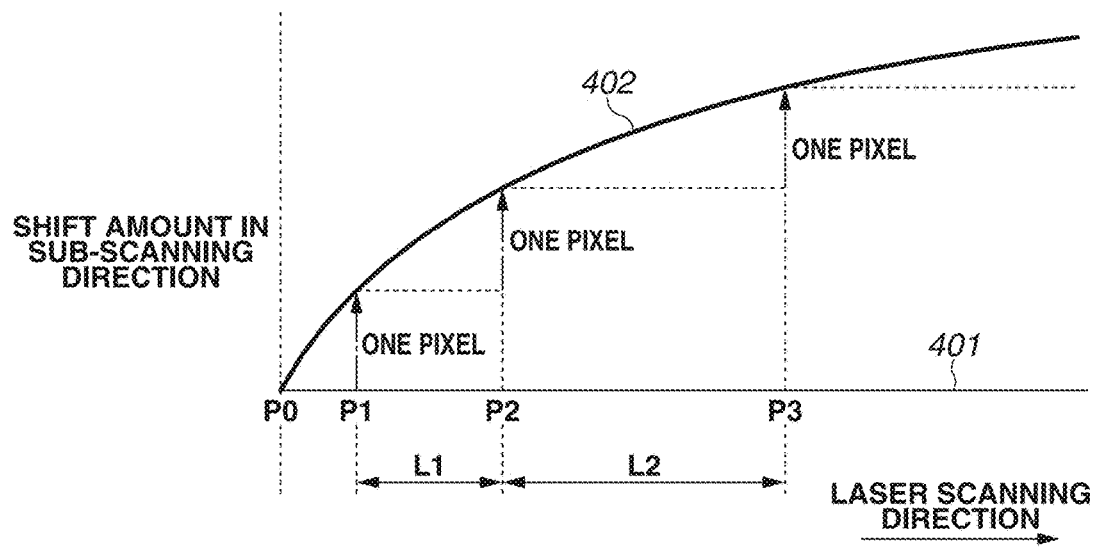
FIGS. 4A and 4B are diagrams each illustrating an example of profile characteristics of the image forming apparatus.
Figure 4B:
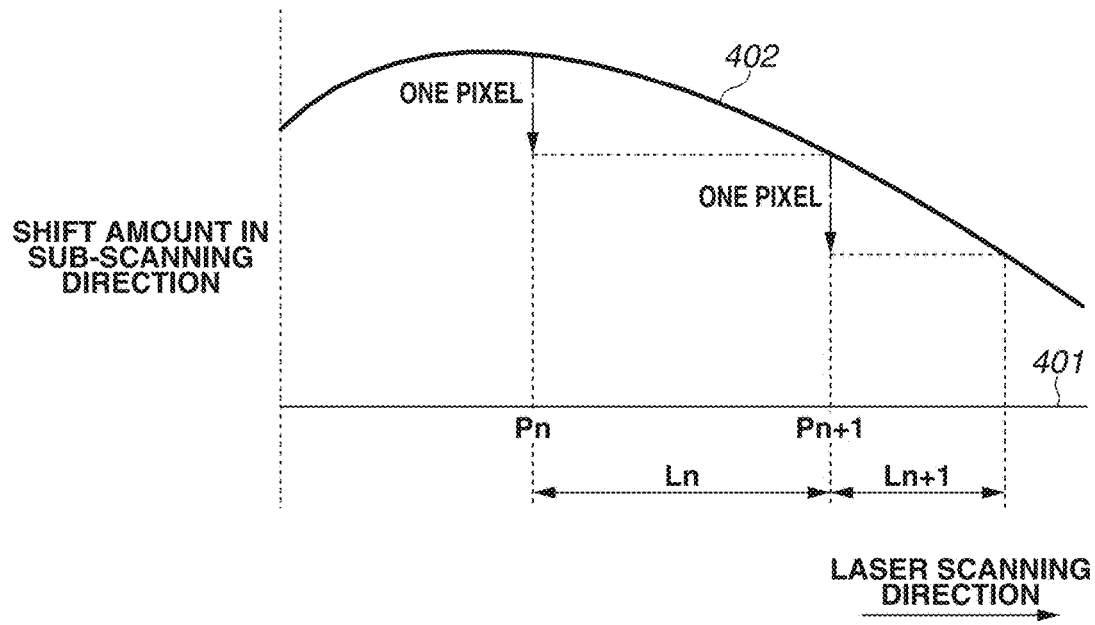

FIG. 4A is a diagram illustrating a region in which the profile characteristics of the image forming apparatus show upward shift with respect to a laser scanning direction. FIG. 4B is a diagram illustrating a region where the profile characteristics of the image forming apparatus show downward shift with respect to the laser scanning direction. A scan line 401 is an ideal scan line, and indicates characteristics in a case where scanning is performed perpendicularly to the rotation direction of the photosensitive member 115.

In the following description, the profile characteristics are defined based on a direction in which correction is to be performed by the image processing unit 102; however, definition of the profile characteristics is not limited thereto.

Alternatively, the profile characteristics may be defined as a shift direction of the image forming unit 101, and the image processing unit 102 may correct reverse characteristics thereof. FIGS. 5A to 5D illustrate correlation between a diagram illustrating a direction in which the correction is to be performed by the image processing unit 102 and a diagram illustrating the shift direction of the image forming unit 101 based on the profile definition. In a case where curve characteristics as illustrated in FIG. 5A are provided as the direction in which the correction is to be performed by the image processing unit 102, the profile characteristics of the image forming unit 101 are characteristics in an opposite direction as illustrated in FIG. 5B. On the other hand, in a case where the characteristics illustrated in FIG. 5C are provided as the curve characteristics of the image forming unit 101, the direction in which the correction is to be performed by the image processing unit 102 is the direction as illustrated in FIG. 5D.

As a method of holding the profile characteristics data, for example, a pixel position of a line transfer position in the main scanning direction and a change directionality until a next line transfer position are held. More specifically, as an example illustrated in FIGS. 6A to 6C, line transfer positions P1, P2, P3, . . . , Pm are defined for the profile characteristics of FIG. 6A. Each of the line transfer positions is defined as a position where shift by one pixel occurs in the sub-scanning direction, and the shift direction includes an upward direction up to the next line transfer position and a downward direction up to the next line transfer position.

For example, the line transfer position P2 is a position to be changed in the upward direction up to the next line transfer position P3. Accordingly, the line transfer direction at the position P2 is the upward direction (↑) as illustrated in FIG. 6B. Likewise, the line transfer direction at the position P3 is also the upward direction (↑) up to the next line transfer position P4. The line transfer direction at the line transfer position P4 is the downward direction (↓) different from the previous direction. The direction data to be held is configured as illustrated in FIG. 6C, for example, when the data indicating the upward direction is set as "1" and the data indicating the downward direction is set as "0". In this case, the number of pieces of data to be held is equal to the number of line transfer positions. If the number of line transfer positions is m pieces, the bit number to be held is also m bits.

The scan lines 402 in FIGS. 4A and 4B are each an actual scan line in which inclination and a curve occur due to positional accuracy and diameter shift of each of the photosensitive members 115 and positional accuracy of an optical system in the scanner units 114 of the respective colors illustrated in FIG. 2. In a case of the color image forming apparatus, the characteristics are different depending on each color.

Next, the line transfer position in the region where the laser scanning direction is shifted upward is described with reference to FIG. 4A.

The line transfer position according to the present exemplary embodiment indicates a pixel position in the main scanning direction at which the line is shifted by one pixel in the sub-scanning direction. In other words, in FIG. 4A, each of the positions P1, P2, and P3 at which the line is shifted by one pixel in the sub-scanning direction on the scan line 402 having the upward curve characteristics corresponds to the line transfer position. The diagram of FIG. 4A is illustrated based on a position P0 as a reference position. As illustrated in FIG. 4A, a distance between the line transfer positions (L1 and L2) is shorter in a region where the scan line 402 having the upward curve characteristics are drastically changed, and is long in a region where the scan line 402 having the upward curve characteristics is gently changed.

Next, the line transfer position in the region where the line scanning direction is shifted downward is described with reference to FIG. 4B. Also in the region where the line scanning direction shows downward characteristics, the line transfer position indicates the position at which the line is shifted by one pixel in the sub-scanning direction. In other words, in FIG. 4B, each of positions Pn and Pn+1 at which the line is shifted by one pixel in the sub-scanning direction on the scan line 402 having the downward curve characteristics corresponds to the line transfer position. Also in FIG. 4B, the distance between the line transfer positions (Ln and Ln+1) is shorter in a region where the scan line 402 having the downward curve characteristics is drastically changed, and is long in a region where the scan line 402 having the downward curve characteristics is gently changed, similar to FIG. 4A.

As described above, the line transfer position closely relates to the change degree of the scan line 402 having the curve characteristics of the image forming apparatus. Accordingly, the number of line transfer positions becomes large in the image forming apparatus having the drastic curve characteristics, whereas the number of line transfer positions becomes small in the image forming apparatus having the gentle curve characteristics.

As described above, the curve characteristics of the image forming apparatus are different for each color. Therefore, the number and positions of the line transfer positions are different for each color. The difference between the colors appears as the registration shift in the image in which the toner images of all colors are transferred on the intermediate transfer member 26.

Next, operation of each of the HT processing units 107 in the image processing unit 102 is described in detail with reference to FIG. 7.

A screen processing unit 701 of each of the HT processing units 107 reads image data of a corresponding color component among CMYK color components from the storage unit 106. The screen processing unit 701 receives image data, and performs halftone processing by screen processing to convert a continuous-tone image into an area tone image with the smaller number of tones.

The screen processing by each of the HT processing units 107 is based on a dithering method in which an optional threshold is read from a dithering matrix including a plurality of thresholds, and input image data and the threshold are compared to obtain N value. The plurality of dithering matrices is held by a dithering matrix holding unit 702, and the dithering matrix to be used is changed depending on the attribute and application of the input image.

The screen processing using the dithering method is described with reference to FIGS. 8A to 8D. Here, binarization is described for simplifying the description. In the screen processing, the image data expressed by a continuous tone is expressed by an area tone, i.e., a tone expressed by a ratio of a colored area and a non-colored area per unit area. The dithering matrix showing growth of a screen is used in the screen processing. The dithering matrix indicates a threshold table used to control the growth of the screen.

FIG. 8A illustrates the input image data, FIG. 8B illustrates the dithering matrix used for the screen processing, and FIG. 8C illustrates screened image data obtained through the screen processing. When the input data of FIG. 8A is provided, the screen processing unit 701 pays attention to a pixel value of each of the pixels in the image data, and compares the pixel value with a corresponding threshold in the dithering matrix of FIG. 8B held by the dithering matrix holding unit 702. As a result of the comparison, when the pixel value of the pixel of interest is larger than the corresponding threshold in the dithering matrix, a pixel in the screened image data of FIG. 8C corresponding to the pixel of interest has a value.

For example, the screen processing is performed with use of the image data that includes 3×3, i.e., 9 pixels each including the pixel value of 130 as illustrated in FIG. 8A, and the dithering matrix that is a 3×3 matrix to binarize the pixel values of the respective input pixels to 0 or 255 as illustrated in FIG. 8B. In a case where the pixel value of each of the input pixels exceed the corresponding threshold of the dithering matrix as a result of the screen processing, the pixel value of the corresponding pixel in the screened image data of FIG. 8C becomes 255. In a case where the pixel value of each of the input pixels is lower than or equal to the corresponding threshold of the dithering matrix, the pixel value of the corresponding pixel in the screened image data of FIG. 8C becomes zero. At this time, an aggregate of the pixels each not including the pixel value of zero in the screened image data of FIG. 8C is referred to as a dot.

Further, by changing an arrangement method for the thresholds of the dithering matrix, the image expressed by using the screened image can be changed. FIG. 8D illustrates an example in which a dithering matrix is repeatedly arranged. The dithering matrix includes four pixels in the main scanning direction (lateral direction) and two pixels in the sub-scanning direction (vertical direction) with 600 dots per inch (dpi). The all pixels are arranged in such a manner that a distance between dots becomes a distance of two pixels in the main scanning direction, and a distance of $2\sqrt{2}$ pixels in the sub-scanning direction. The image in FIG. 8D is referred to as a screened image of 212 lines because the number of dots in 1 inch, i.e., in the 600 pixels becomes about 212 from calculation of $600/2\sqrt{2}$.

<Registration Shift Correction Processing>

Figure 7:
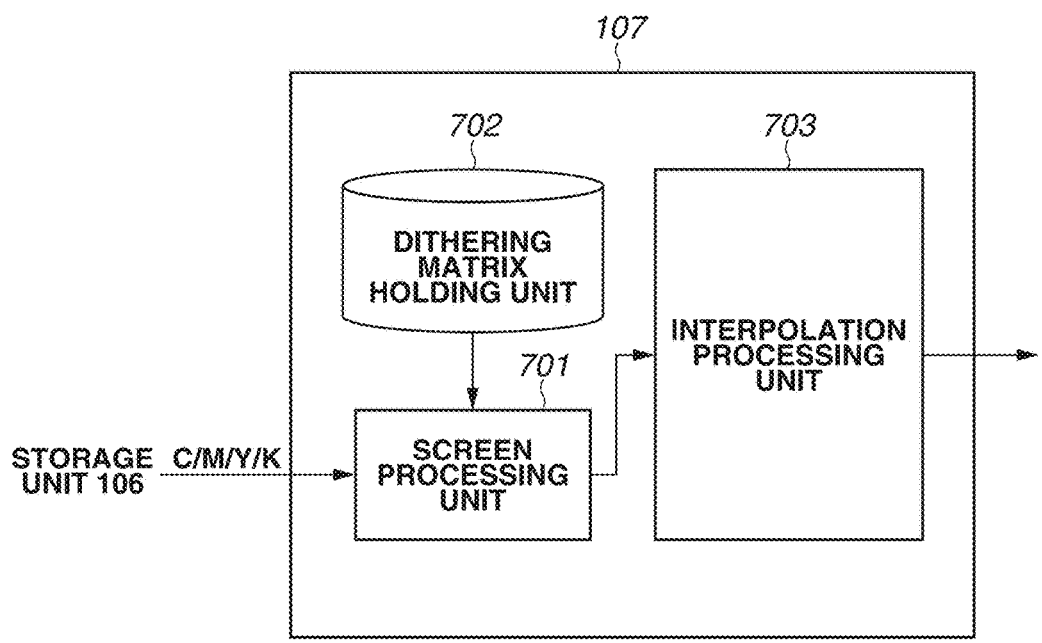
FIG. 7 is a block diagram illustrating a configuration of a halftone (HT) processing unit.

Next, an interpolation processing unit 703 in FIG. 7 is described in detail with reference to FIGS. 9A to 9C, FIGS. 10A to 10C, FIGS. 11A to 11C, FIGS. 12A to 12C, and FIG. 15. FIG. 15 is a flowchart illustrating processing contents executed by the interpolation processing unit 703.

First, flow of the interpolation processing executed by the interpolation processing unit 703 is described with reference to FIG. 15.

In step S1501, the screen-processed image is input to the interpolation processing unit 703, and the interpolation processing unit 703 calls the profile characteristics held by the device characteristics storage unit 103 and acquires the pixel position in the main scanning direction and the transfer direction of the line transfer position.

Next, in step S1502, the interpolation processing unit 703 refers to the input image one line by one line in the scanning direction, and performs halftone image determination processing to determine whether the line transfer position called in step S1051 is included in a halftone image. In addition, the interpolation processing unit 703 generates a halftone image flag.

Next, in step S1503, the interpolation processing unit 703 performs line transfer processing to shift the line by one pixel in the sub-scanning direction, based on the profile characteristics called in step S1501.

Next, in step S1504, the interpolation processing unit 703 refers to the halftone image determination flag generated in step S1502 to determine whether the line transfer position is included in a halftone image. In a case where the halftone image determination flag is 1, the interpolation processing unit 703 determines that the line transfer position is included in the halftone image (YES in step 1504), and outputs the image having been subjected to the line transfer processing. In a case where the halftone image determination flag is 0, the interpolation processing unit 703 determines that the line transfer position is not included in the halftone image (NO in step S1504), and the processing proceeds to step S1505.

Next, in step S1505, the interpolation processing unit 703 performs step correction processing to eliminate a transfer step, and outputs the resultant image.

The line transfer processing executed in the flow is described in detail with reference to FIGS. 9A to 9C. The step correction processing is described in detail with reference to FIGS. 10A to 10C and FIGS. 11A to 11C. The halftone image determination processing is described in detail with reference to FIG. 12.

Figure 9A:
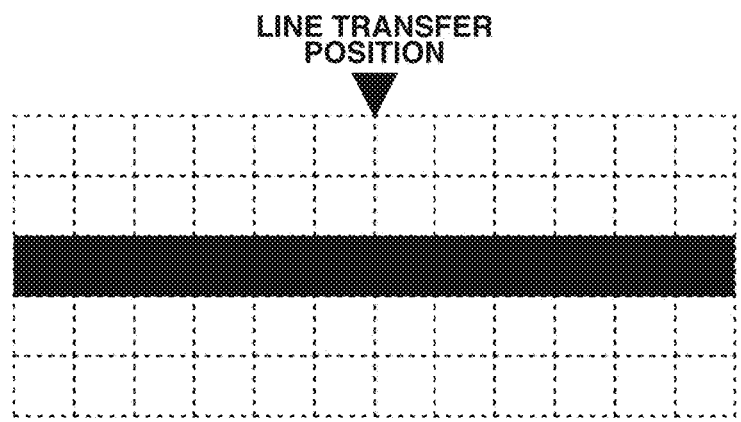
FIGS. 9A to 9C are diagrams illustrating transfer processing on a straight line image.
Figure 9B:
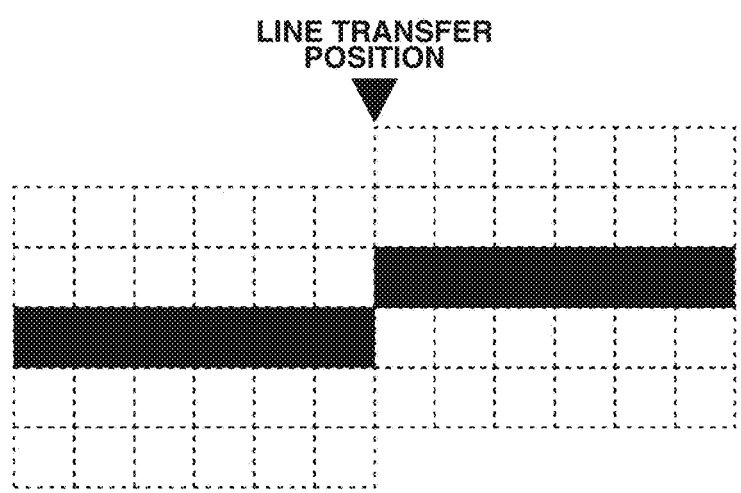
Figure 9C:
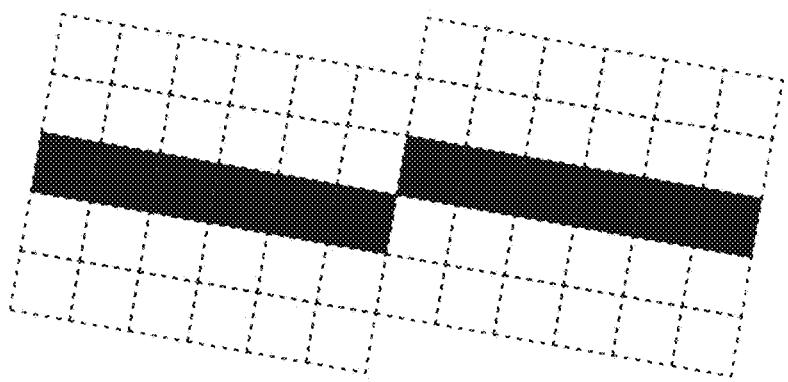

FIG. 9A schematically illustrates a state of thin line image data generated by the screen processing unit 701. As illustrated in FIG. 9A, in a state of the image data generated by the screen processing unit 701, the data having processed by the screen processing unit 701 is held irrespective of the correction direction by the interpolation processing unit 703 or the curve characteristics by the image forming unit 101. In a case where the profile characteristics as the direction in which the correction is to be performed by the interpolation processing unit 703 is an upward direction, a straight line 901 of FIG. 9A is corrected to a state where the line is shifted by one pixel in the upward direction at the line transfer position as a boundary, as illustrated in FIG. 9B. As a result, the image shape actually drawn on the photosensitive member 115 becomes a shape illustrated in FIG. 9C, which allows for line drawing in consideration of inclination.

Figure 10A:
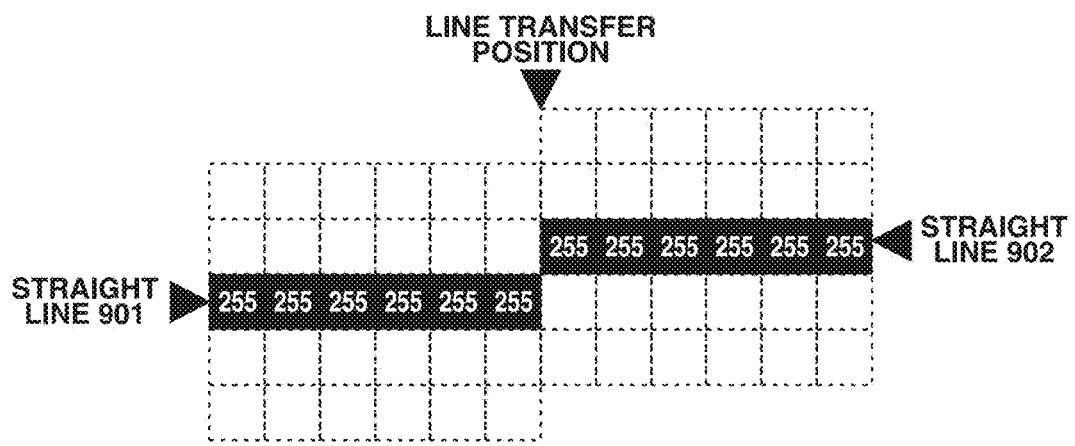
FIGS. 10A to 10C are diagrams illustrating processing to correct a step generated by the transfer processing.
Figure 10B:
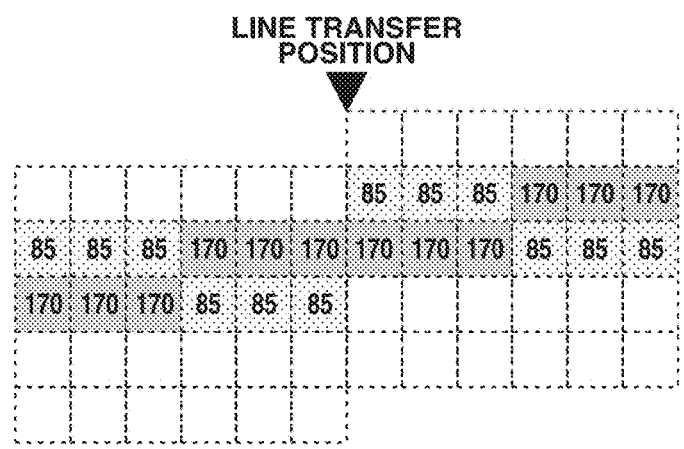
Figure 10C:
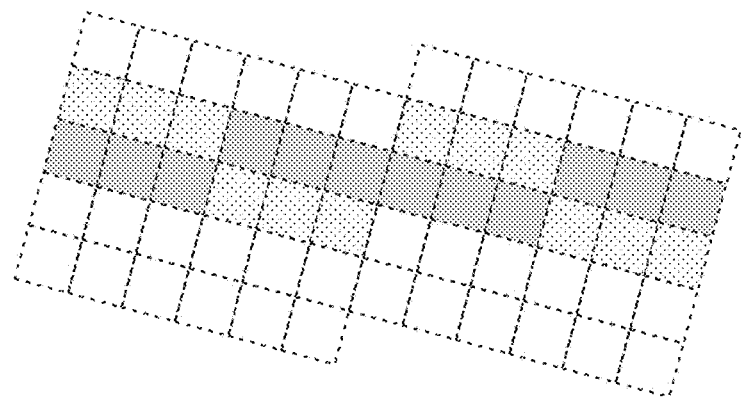

Next, the processing of correcting the step caused by the line transfer processing is described with reference to FIGS. 10A to 10C. As illustrated in FIG. 10A, the straight line 901 is shifted by one pixel at the line transfer position, which allows for the line drawing in consideration of the inclination as illustrated in FIG. 9C. However, the shift by one pixel causes the step in the straight line 901. Accordingly, the tone values of the image data of pixels the prior and subsequent line transfer position in the sub-scanning direction are adjusted in order to eliminate the step. In other words, the pixel values of the straight line are smoothed in the sub-scanning direction to guarantee the quality of the straight line. The step correction processing for step elimination is described with reference to FIGS. 10A to 10C. FIG. 10A is a diagram illustrating that the straight line 901 is shifted by one pixel in the sub-scanning direction, as with FIG. 9B. FIG. 10B illustrates an image obtained by performing smoothing processing of the sub-scanning direction on the straight line 901. With respect to six pixels of the straight line 901 prior to the line transfer position, smoothing, in which weighting is performed on pixels located by one pixel above the pixels where the straight line 901 is originally drawn, is performed on three pixels near the line transfer position, and smoothing, in which weighting is performed on the pixels where the straight line 901 is originally drawn, is performed on remaining three pixels. A weighting ratio at this time is set to 2:1. On the other hand, with respect to the straight line 902 subsequent to the line transfer position, smoothing, in which weighting is performed on pixels where the straight line 902 is originally drawn, is performed on three pixels near the line transfer position, and smoothing, in which weighting is performed on pixels located by one pixel above the pixels where the straight line 902 is originally drawn, is performed on remaining three pixels. The weighting ratio at this time is set to 2:1. When the smoothing in the sub-scanning direction is performed in the above-described manner, the shape of the image actually drawn on the photosensitive member 115 becomes a shape illustrated in FIG. 10C. This makes it possible to guarantee the quality of the straight line while considering the inclination. The smoothing at this time is merely an example, and the smoothing method is not limited thereto.

Figure 11A:
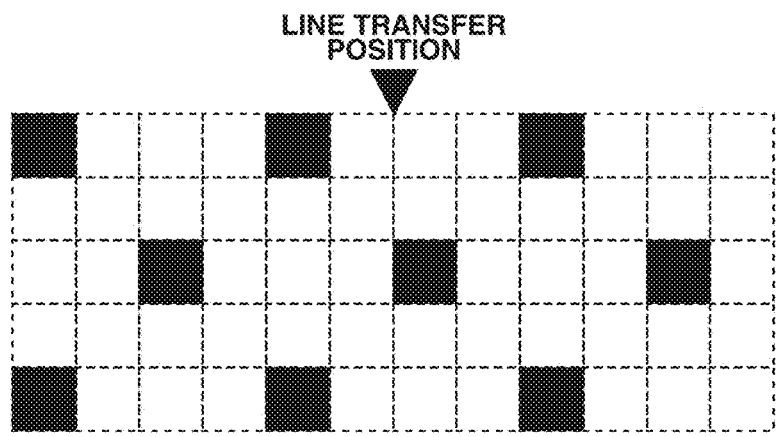
FIGS. 11A to 11C are diagrams illustrating the transfer processing on a halftone image.
Figure 11B:
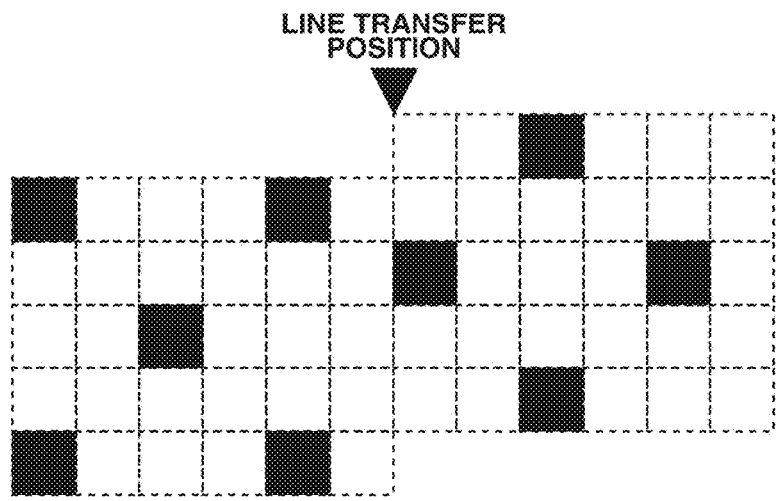
Figure 11C:
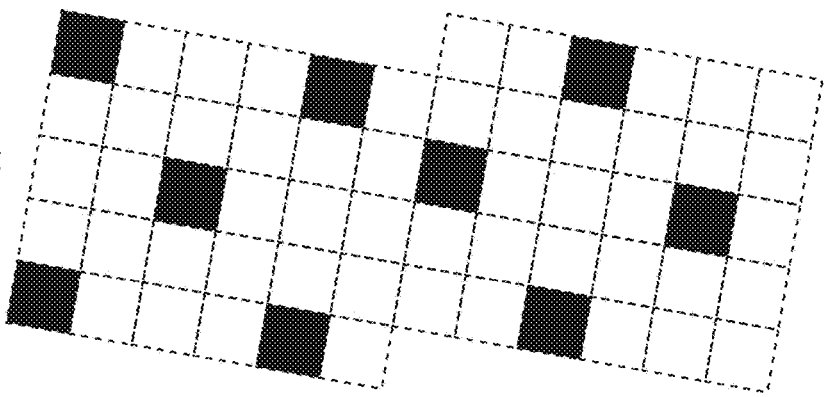

When the correction processing to eliminate the step in the line described above is performed on the halftone image formed by the screen processing, as illustrated in FIG. 11A, a dot pattern formed by the screen processing is destroyed. As a result, density characteristics become different between the corrected position and other positions, which causes density unevenness. Therefore, as illustrated in FIG. 11B, it is preferable that the correction processing for step elimination is not performed on the halftone image, after the correction to shift the line by one pixel in the sub-scanning direction at the line transfer position as a boundary. Thus, the shape of the image drawn on the photosensitive member 115 becomes a shape illustrated in FIG. 11C.

As described above, it is desirable to determine whether to perform the step correction processing, based on whether the line transfer position is included in a halftone image. Therefore, it is helpful to perform halftone image determination processing to determine whether to perform the step correction processing at the line transfer position, before the step correction processing. The halftone image determination processing is described with reference to FIGS. 12A to 12C. The image is determined as the halftone image when the image is referred to in a determination region including a predetermined length (e.g., length of 30 pixels) in the main scanning direction from the pixel of interest, and at least a predetermined number of (e.g., two or more) changes from a non-lighting pixel to a lighting pixel or reverse changes (edges) is included in the determination region. However, the length of the determination region is not limited thereto. When the image is referred to in the determination region and at least two or more lighting pixels are included in the determination region, it may be determined that the pixel of interest is included in the halftone region.

Figure 12A:
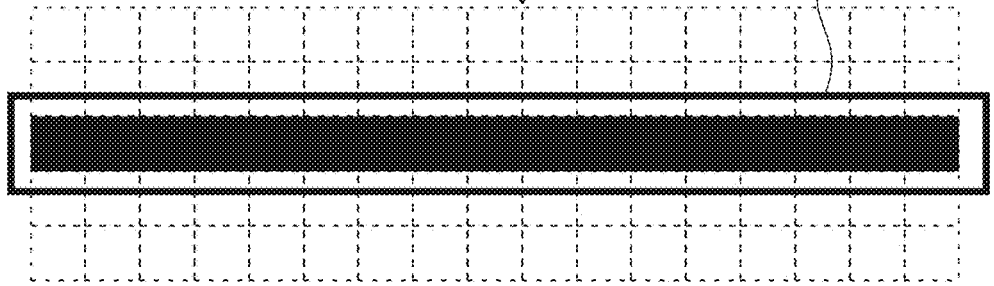
FIGS. 12A to 12C are diagrams illustrating processing contents of halftone image determination processing.
Figure 12B:
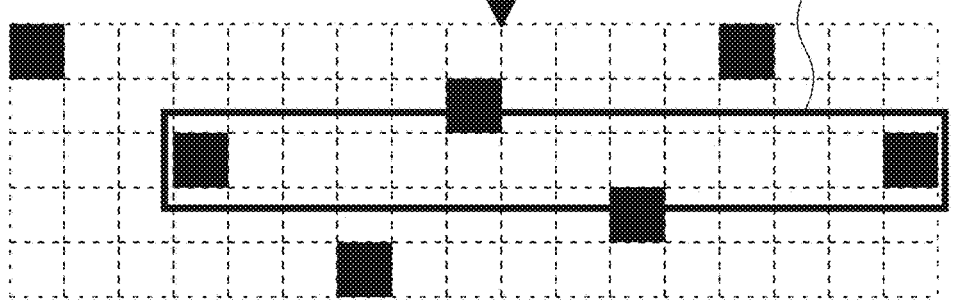
Figure 12C:
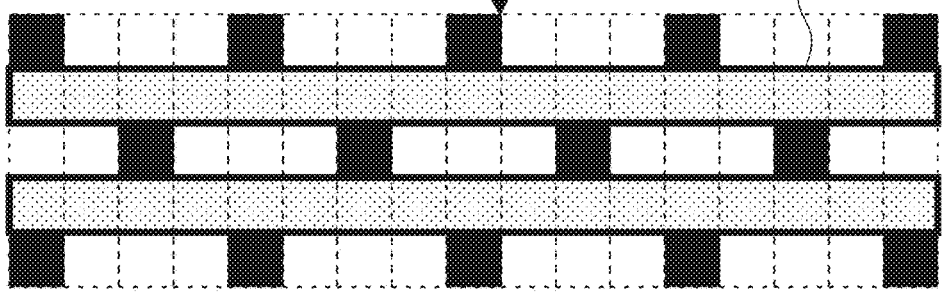

FIG. 12A illustrates a state where the halftone image determination processing is performed on the thin line image data generated by the screen processing unit 701. In the determination region of FIG. 12A, the lighting pixels are continuously arranged. Therefore, the determination region of FIG. 12A is not determined as the halftone image. As a result, a halftone image determination flag is set to zero. Accordingly, the step correction processing is not turned off and is executed. Next, a case where the halftone image determination processing is performed on the halftone image is described. FIG. 12B illustrates a state where the halftone image determination processing is performed on the dot pattern image that has been generated through the screen processing with use of the dithering matrix of 166 lines. When the screen processing with use of the dithering matrix of 166 lines is performed, a new dot is detected at a position separated by 14 pixels in the main scanning direction from one dot, as illustrated in FIG. 12B. In other words, when the determination region of 30 pixels in the main scanning direction after the detected pixel is prepared, it is possible to detect a new dot. As described above, it is possible to determine whether the region is included in the halftone image, by referring one line in the main scanning direction with respect to the halftone image generated by the screen processing to set the determination region, and determining whether the plurality of edges are included in the determination region. As a result, the halftone image determination flag is set to one, and the step correction processing is turned off. Thus, the dot pattern is saved. FIG. 12C illustrates a state where the halftone image determination processing is performed on the dot pattern image that has been generated through the screen processing with use of the dithering matrix of 212 lines. As illustrated in FIG. 12C, a region including only non-lighting pixels with no dot in the main scanning direction appears in spite of the halftone image. Therefore, the region including only the non-lighting pixels is not determined as the halftone region and the halftone image determination flag is set to zero. Thus, the region is regarded as an object of the step correction processing although the step correction processing is unnecessary.

Figure 13A:
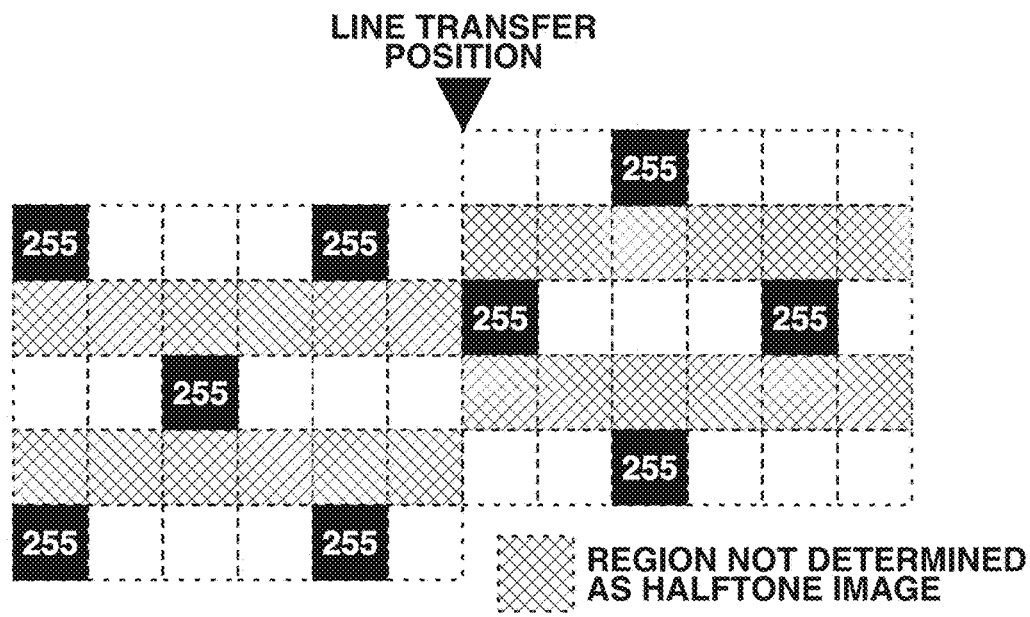
FIGS. 13A and 13B are diagrams illustrating a state in a case where the step correction processing is performed on the halftone image.
Figure 13B:
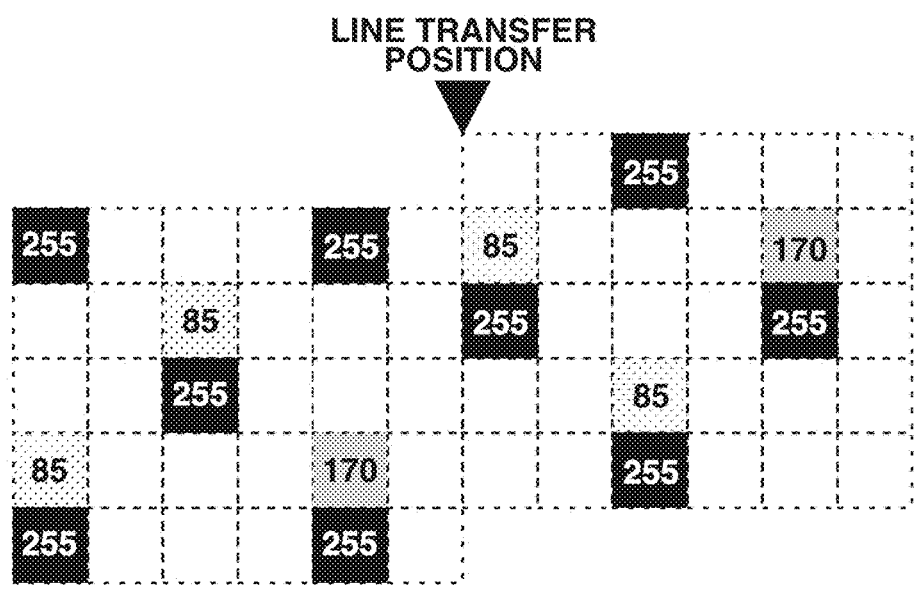

FIGS. 13A and 13B illustrate an example that has been erroneously determined as not the halftone image and been erroneously subjected to the step correction processing. As illustrated in FIG. 13A, a region including no dot is not determined as the halftone region. Therefore, the smoothing processing that is not to be originally performed on the halftone region is performed on the region. As a result, for example, in a case where the smoothing processing performed in FIG. 10B described above is performed, the dot shape is destroyed as illustrated in FIG. 13A. As a result, the dot shape is broken, and it causes density unevenness. Therefore, in the case where, like the dithering matrix of 212 lines, the dithering matrix including the region where no dot exists in the main scanning direction is used in the image forming apparatus including the above-described halftone image determination processing, it is helpful to shift the first dot lighting position.

A lighting order of the dithering matrix of 212 lines according to the present exemplary embodiment is described with reference to FIGS. 14A to 14C. FIG. 14A is a diagram illustrating a configuration of the dithering matrix of 212 lines. At this time, a matrix indicating the minimum unit of the dot lighting pattern in the dithering matrix is referred to as a sub-matrix. The number of pixels in the vertical direction and the horizontal direction of the sub-matrix is the same among sub-matrices. The dithering matrix illustrated in FIG. 14A includes a plurality of sub-matrices, and one sub-matrix indicates a lighting order of eight dots. Circled numbers in FIG. 14A indicate the lighting order of the dots in each of the sub-matrices. Each of the sub-matrices includes a first dot (dot at growth center) that is lit first, and a second dot that is lit second. The first dot and the second dot are adjacent to each other in the sub-scanning direction (vertical direction), and a group of the first dot and the second dot is referred to as a first dot group. The first dot group is located at the same position among the sub-matrices. In a case where the screen processing is performed with use of the dithering matrix, the first dot is lit first; however, in the case where the position of the first dot is the same among the sub-matrices, the region where no dot exists in the main scanning direction is generated as described above. Accordingly, the positional relationship of the first dot and the second dot in the first dot group is changed for each sub-matrix to eliminate the region where no dot exists in the main scanning direction. As illustrated in FIG. 14A, two types of positional relationship between the first dot and the second dot in the sub-scanning direction are prepared. FIG. 14B illustrates image data obtained after the screen processing in a state where the first dot has been lit. As illustrated in FIG. 14B, at least one first dot appears in the main scanning direction (lateral direction). In this way, even in the case of the dithering matrix of 212 lines, it is possible to determine the image as a halftone image in the halftone image determination processing. FIG. 14C illustrates a state of the dithering matrix where the second dot is lit. As illustrated in FIG. 14C, the first dot group is lit, and the dot shapes are the same among the sub-matrices, and the number of lines is maintained at 212 lines. In the dithering matrix illustrated in FIG. 14A, the lighting order of third or subsequent dots in each of the sub-matrices is the same among the sub-matrices; however, it may be different among the sub-matrices.

As described above, in the image forming apparatus that refers to the pixel in the main scanning direction to determine whether the pixel is included in the halftone image, the screen processing is performed with use of the dithering matrix including the line number such as 212 lines that forms the dot pattern where no dot exists in the main scanning direction. At this time, shifting the position of the dot that is first lit for each sub-matrix makes it possible to avoid erroneous determination in the halftone image determination processing. As a result, by performing the shift processing in the sub-scanning direction at the line transfer position for the registration correction, the step correction processing of the straight line region can be performed without influencing the halftone image.

As one of the determination method in the halftone image determination processing, the image after the screen processing may be referred to for a predetermined length from the pixel of interest in the main scanning direction, and whether the referred region is included in the halftone image may be determined based on whether a dot exists in the referred region. In the halftone image subjected to the screen processing using the predetermined dithering matrix, the pixel to be drawn (lighting pixel) and the pixel not to be drawn (non-lighting pixel) appear at a predetermined cycle. Accordingly, it is possible to perform halftone image determination by referring to the region of a length at least equal to or larger than the cycle from the pixel of interest, and detecting the position where the dot exists in the referred region, i.e., a position where the pixel is changed from the non-lighting pixel to the lighting pixel or a position where opposite change occurs (edge). The method enables the determination by acquiring the image data of one line in the main scanning direction. Therefore, the plurality of line memories are not necessary and the halftone image determination can be performed at low cost.

In the above-described halftone image determination processing, however, the different determination result may sometimes be obtained depending on the type of the screen used in the image formation even though it is the halftone image.

For example, in a case where the screen processing is performed with use of the dithering matrix of 212 lines at 45 degrees, a region where no dot exists in the main scanning direction is generated in a highlight region. In this case, the regions is not determined as the halftone image by the above-described halftone region determination method even though it is the halftone image, and as a result, the interpolation processing is performed on the halftone image.

According to the first exemplary embodiment, shifting the position of the dot that is first lit for each sub-matrix makes it possible to avoid the above-described erroneous determination in the halftone image determination processing.

In the first exemplary embodiment, the dithering matrix for performing image formation in which at least one dot exists in the lateral direction in the image data obtained after the screen processing by devising the position of the dot lit first and the position of the dot lit second in the dithering matrix of 212 lines, has been described.

However, in this case, the dot distances become nonuniform because the position of the dot lit first is changed for each sub-matrix. Therefore, for example, in a case of the image forming apparatus that is high in reproducibility of one dot, texture may be observed. Accordingly, in a second exemplary embodiment, the size of the dithering matrix is increased to increase the number of sub-matrices, and the appearance positions of the first dot groups each including the combination of the first dot and the second dot different in lighting order are made to separate from one another. This makes it possible to avoid erroneous determination while reducing the texture.

Figure 16A:
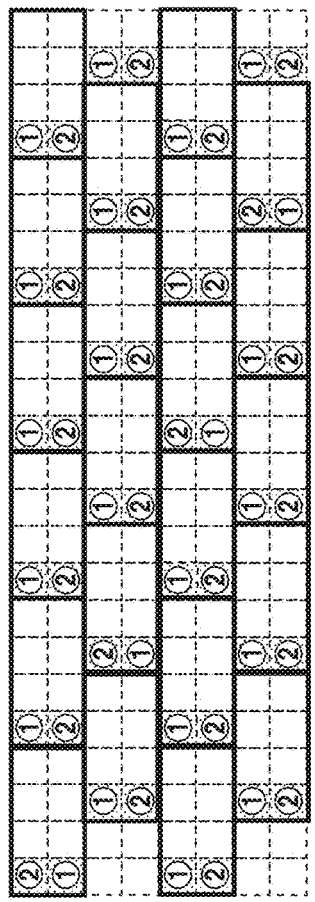
FIGS. 16A to 16C are diagrams illustrating a lighting order of dots in a dithering matrix according to a second exemplary embodiment.
Figure 16B:
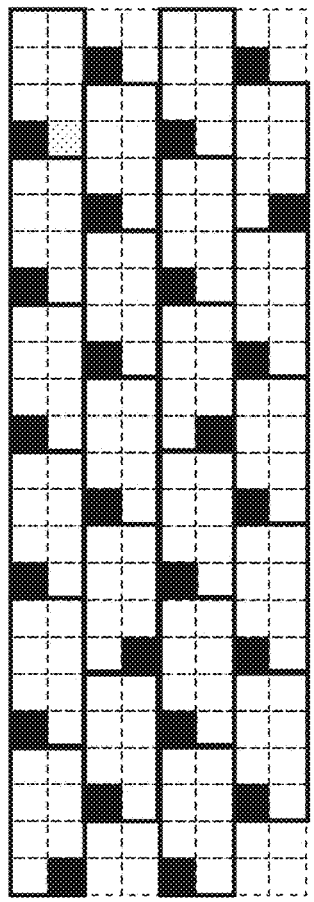
Figure 16C:
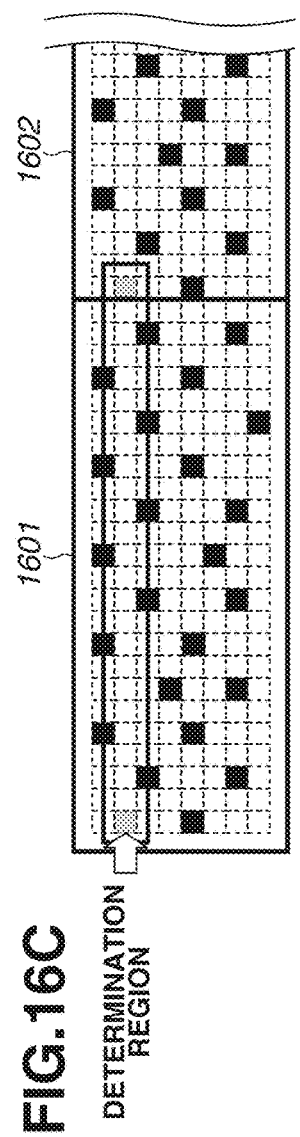

The growth order of the dithering matrix according to the second exemplary embodiment is described with reference to FIGS. 16A to 16C. FIG. 16A illustrates a lighting order of the dots in the dithering matrix according to the present exemplary embodiment. The dithering matrix in FIGS. 16A to 16C includes 212 lines, and includes a plurality of sub-matrices. Circled numbers indicate the lighting order of the dots in each of the sub-matrices. The lighting order of a third dot and subsequent dots is omitted for simplification.

As illustrated in FIG. 16A, the dithering matrix includes 24 first dot groups. To perform the screen processing that does not generate the region where no dot exists in the lateral direction in the dithering matrix, the lighting positions of the first dots and the second dots in four first dot groups are made different from those of remaining dot groups, from among the 24 first dot groups. FIG. 16B illustrates a resultant image in which the first dots are lit with use of the dithering matrix of FIG. 16A, and FIG. 16C illustrates a screen image that is obtained by repeating the dithering matrix of FIG. 16A twice in the main scanning direction. Pattern images 1601 and 1602 are obtained through the screen processing using the dithering matrix of FIG. 16A. As illustrated in FIG. 16C, the region where no dot exists in the main scanning direction does not exist. At the same time, patterns different in inter-dot distance are not continuously present, which makes the texture inconspicuous. Accordingly, it is possible to avoid erroneous determination in the halftone image determination processing while reducing the texture.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like, and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-243008, filed Dec. 19, 2017, which is hereby incorporated by reference herein in its entirety.

What is claimed is:

1. An image forming apparatus comprising:
   a screen processing unit configured to perform screen processing on image data based on a result of comparison between a value of a pixel in the image data and a threshold of a dithering matrix corresponding to the pixel; and
   a determination unit configured to determine whether a pixel of interest is included in a halftone image in the image data having been subjected to the screen processing by the screen processing unit, based on a pixel value in a region having a predetermined length in a lateral direction from the pixel of interest,
   wherein the dithering matrix includes a plurality of sub-matrices,
   wherein out of the plurality of sub-matrices, a first sub-matrix and a second sub-matrix that have a same number of pixels in a vertical direction and in the lateral direction are adjacent to each other in the lateral direction,
   wherein a threshold at a growth center in the first sub-matrix and a threshold at a growth center in the second sub-matrix are located at different positions in the vertical direction, and
   wherein the predetermined length is larger than that corresponding to the number of pixels in the lateral direction of the first sub-matrix.

2. The image forming apparatus according to claim 1, wherein a threshold secondly growing in the first sub-matrix and the threshold at the growth center in the second sub-matrix are located at a same position in the vertical direction in the dithering matrix.

3. The image forming apparatus according to claim 1, wherein the threshold at the growth center and a threshold secondly growing in the first sub-matrix are adjacent to each other in the vertical direction.

4. The image forming apparatus according to claim 1, wherein the determination unit determines, in a case where a number of edges included in the region having the predetermined length is greater than or equal to a predetermined number, that the pixel of interest is included in the halftone image.

5. The image forming apparatus according to claim 1, further comprising a correction unit configured to perform, on the pixel determined to be included in the halftone image by the determination unit, one-pixel shift processing in the vertical direction at a line transfer position and correction processing to correct a step caused by one-pixel shift processing.

6. An image forming method comprising:

performing screen processing on image data based on a result of comparison between a value of a pixel in the image data and a threshold of a dithering matrix corresponding to the pixel; and determining whether a pixel of interest is included in a halftone image in the image data having been subjected to the screen processing, based on a pixel value in a region having a predetermined length in a lateral direction from the pixel of interest, wherein the dithering matrix includes a plurality of sub-matrices, wherein, out of the plurality of sub-matrices, a first sub-matrix and a second sub-matrix that have a same number of pixels in a vertical direction and in the lateral direction are adjacent to each other in the lateral direction, wherein a threshold at a growth center in the first sub-matrix and a threshold at a growth center in the second sub-matrix are located at different positions in the vertical direction, and wherein the predetermined length is larger than that corresponding to the number of pixels in the lateral direction of the first sub-matrix.

7. The image forming method according to claim 6, wherein a threshold secondly growing in the first sub-matrix and the threshold at the growth center in the second sub-matrix are located at a same position in the vertical direction in the dithering matrix.

8. The image forming method according to claim 6, wherein the threshold at the growth center and a threshold secondly growing in the first sub-matrix are adjacent to each other in the vertical direction.

9. The image forming method according to claim 6, wherein, in a case where a number of edges included in the region having the predetermined length is greater than or equal to a predetermined number, the pixel of interest is determined to be included in the halftone image.

10. The image forming method according to claim 6, further comprising performing, on the pixel determined to be included in the halftone image, one-pixel shift processing in the vertical direction at a line transfer position and correction processing to correct a step caused by one-pixel shift processing.

11. A non-transitory computer-readable storage medium storing a computer program for causing a computer to execute a method of controlling an image forming apparatus, the method comprising:

performing screen processing on image data based on a result of comparison between a value of a pixel in the image data and a threshold of a dithering matrix corresponding to the pixel; and determining whether a pixel of interest is included in a halftone image in the image data having been subjected to the screen processing, based on a pixel value in a region having a predetermined length in a lateral direction from the pixel of interest, wherein the dithering matrix includes a plurality of sub-matrices, wherein, out of the plurality of sub-matrices, a first sub-matrix and a second sub-matrix that have a same number of pixels in a vertical direction and in the lateral direction are adjacent to each other in the lateral direction, wherein a threshold at a growth center in the first sub-matrix and a threshold at a growth center in the second sub-matrix are located at different positions in the vertical direction, and wherein the predetermined length is larger than that corresponding to the number of pixels in the lateral direction of the first sub-matrix.

\* \* \* \* \*